(12) United States Patent
Sandhu

(10) Patent No.: US 8,057,686 B2
(45) Date of Patent: Nov. 15, 2011

(54) NANOTUBE SEPARATION METHODS

(75) Inventor: Gurtej S. Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 373 days.

(21) Appl. No.: 11/713,452

(22) Filed: Mar. 2, 2007

(65) Prior Publication Data
US 2008/0213159 A1    Sep. 4, 2008

(51) Int. Cl.
*C02F 1/68*    (2006.01)
(52) U.S. Cl. ............... 210/749; 423/447.1; 423/461; 977/745; 977/746; 977/845; 977/847; 210/639; 204/557
(58) Field of Classification Search ........... 423/447.1, 423/460–461; 977/745, 746, 845, 847; 210/634, 210/638, 749, 695, 787, 639; 205/80, 558; 204/557
See application file for complete search history.

(56) References Cited

U.S. PATENT DOCUMENTS

| | | | |
|---|---|---|---|
| 7,115,864 B2 | 10/2006 | Colbert et al. | |
| 7,131,537 B2 | 11/2006 | Papadimitrakopoulos | |
| 2004/0038251 A1* | 2/2004 | Smalley et al. | 435/6 |
| 2006/0233694 A1 | 10/2006 | Sandhu et al. | |
| 2006/0278579 A1* | 12/2006 | Choi et al. | 210/634 |

FOREIGN PATENT DOCUMENTS
WO    WO2005077827    *  8/2005

OTHER PUBLICATIONS

Huang, W.; "Attaching Proteins to Carbon Nanotubes via Diimide-Activated Amidation". Nano Letters. 2002. 2 (4). 311-314.*
Lim et al., "Atomic layer deposition of transition metals", Nature Materials, vol. 2, Nov. 2003, pp. 749-752.
Dai et al., "Electrical Transport Properties and Field Effect Transistors of Carbon Nanotubes", NANO: Brief Reports and Reviews, vol. 1, No. 1, 2006, pp. 1-13.
Materials Today, vol. 9, No. 1-2, Jan.-Feb. 2006, p. 9.

* cited by examiner

*Primary Examiner* — Stuart Hendrickson
*Assistant Examiner* — Richard M Rump
(74) *Attorney, Agent, or Firm* — Wells St. John P.S.

(57) ABSTRACT

A nanotube separation method includes depositing a tag on a nanotube in a nanotube mixture. The nanotube has a defect and the tag deposits at the defect where a deposition rate is greater than on another nanotube in the mixture lacking the defect. The method includes removing the tagged nanotube from the mixture by using the tag. As one option, the tag may contain a ferromagnetic material and the removing may include applying a magnetic field. As another option, the tag may contain an ionic material and the removing may include applying an electric field. As a further option, the tag may contain an atom having an atomic mass greater than the atomic mass of carbon and the removing may include applying a centrifugal force to the nanotube mixture. Any two or more of the indicated removal techniques may be combined.

24 Claims, 2 Drawing Sheets

NANOTUBE SEPARATION METHODS

TECHNICAL FIELD

Nanotube separation methods, including methods for separating nanotubes having a defect.

BACKGROUND

Nanotubes are well known structures exhibiting useful structural, electrical, thermal, and other properties presently of interest in a wide variety of technology areas. Nanotubes may exhibit a variety of intrinsic conductivity states. Fabrication techniques may produce single-wall nanotubes (SW-NT) and/or multiwall nanotubes (MW-NT). Fabrication techniques may also produce nanotubes of varying diameter and/or length. Further, fabrication techniques may produce a variety of chiralities (zigzag, armchair, and chiral). In addition to their composition and perhaps other physical properties, the listed characteristics can influence whether a nanotube is "metallic" (that is, conductive), semiconductive, or insulative.

For some applications, the electrical properties of nanotubes may be of small consequence. However, for other applications, consistent electrical properties between nanotubes may be desired. A difficulty exists in sorting nanotubes according to their electrical or physical properties and/or controlling fabrication methods to produce selected properties. In addition to variance of intrinsic properties between certain types of nanotubes, variance of properties may exist within the same type of nanotube due to defects resulting from a disruption in the pattern of chemical bonds often present in a nanotube. Such defects may potentially change conduction or otherwise have significant implications in some uses for nanotubes.

A variety of techniques are under investigation to sort nanotubes according to their electrical or other properties or to purify nanotube mixtures, removing the byproducts, such as catalysts, particles, etc., of nanotube formation methods. However, conventional purification does not address defective nanotubes and they may remain in purified nanotube mixtures. Even though, techniques exist for identifying the existence and location of nanotube defects, manual sorting remains as the only option for separating nanotubes identified as defective from nanotubes lacking defects. Clearly then, a need exists in the art for better nanotube separation methods.

DETAILED DESCRIPTION OF THE ILLUSTRATED EMBODIMENTS

Figure 1:
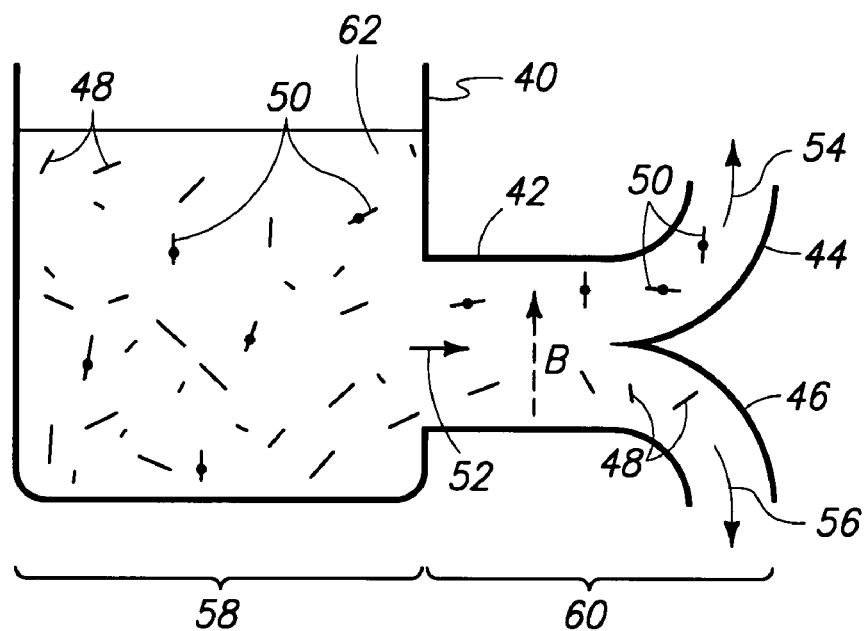
FIGS. 1-4 illustrate application of various nanotube separation methods.

Ian Salusbury, *Finding Fault With Carbon Nanotubes*, Materials Today, vol. 9, No. 1-2, January-February 2006, page 9, reports techniques for electrochemically depositing materials at defect sites of carbon nanotubes to determine the prevalence of defects. Similarly, H. Dai, et al., *Electrical Transport Properties and Field Effect Transistors of Carbon Nanotubes*, NANO: Brief Reports and Reviews, vol. 1, No. 1, 2006, pgs. 1-13 reports the failure of atomic layer deposition (ALD) of dielectric materials to nucleate on nanotubes except at defect sites. Such methods and others that may be appreciated from the subject matter described herein may be used to tag a nanotube having a defect. The tagged nanotube may then be removed.

Within the context of the present document, a nanotube "defect" refers to a condition in the nanotube structure that gives rise to a reactive site more susceptible to deposition of a tag in comparison to other portions of the nanotube lacking the defect. Normally, nanotubes exhibit a uniform pattern of chemical bonds. As one example, a defect may include the dangling bonds associated with a disruption in the bond pattern, although, other possibilities are conceivable.

A nanotube separation method according to an embodiment of the present specification includes depositing a tag on a nanotube in a nanotube mixture. The nanotube has a defect and the tag deposits at the defect where a deposition rate is greater than on another nanotube in the mixture lacking the defect. The method includes removing the tagged nanotube from the mixture by using the tag. By way of example, depositing the tag may include chemisorbing the tag at the defect where a chemisorption rate is greater than on another nanotube in the mixture lacking the defect. To increase differentiation between defective nanotubes and nanotubes lacking a defect, the method may include not chemisorbing the tag on the other nanotube lacking the defect.

The specific structure of the tag desired may depend on the nature of the removal process intended. As one option, the tag may consist of a single monolayer of molecules chemisorbed at the defect. Such single monolayer of molecules may be adequate to interact with a subsequent removal technique, accomplishing the desired separation. In other circumstances, chemisorbing the tag may include ALD of the tag. For example, the tag may include a plurality of monolayers.

ALD involves formation of successive atomic layers on a substrate. Such layers may comprise an epitaxial, polycrystalline, amorphous, etc. material. ALD may also be referred to as atomic layer epitaxy, atomic layer processing, etc. Described in summary, ALD includes exposing an initial substrate to a first chemical precursor to accomplish chemisorption of the precursor onto the substrate. Theoretically, the chemisorption forms a monolayer that is uniformly one atom or molecule thick on the entire exposed initial substrate. In other words, a saturated monolayer. Practically, chemisorption might not occur on all portions of the substrate. Nevertheless, such an imperfect monolayer is still a monolayer in the context of this document. Accordingly, a tag chemisorbed at a nanotube defect may thus include a saturated monolayer at the defect. Alternatively, chemisorption might not occur on all portions of the defect.

The first precursor is purged from over the substrate and a second chemical precursor is provided to react with the first monolayer of the first precursor. The second precursor is then purged and the steps are repeated with exposure of the deposited monolayer to the first precursor. In some cases, the two monolayers may be of the same precursor. As an option, the second precursor can react with the first precursor, but not chemisorb additional material thereto. As but one example, the second precursor can remove some portion of the chemisorbed first precursor, altering such monolayer without forming another monolayer thereon. Also, a third precursor or more may be successively chemisorbed (or reacted) and purged just as described for the first and second precursors.

In the context of the present document, "reacting" or "reaction" refers to a change or transformation in which a substance decomposes, combines with other substances, or interchanges constituents with other substances. Thus, it will be appreciated that "chemisorbing" or "chemisorption" is a specific type of reacting or reaction that refers to taking up and chemically binding (a substance) onto the surface of another substance.

ALD is often described as a self-limiting process, in that a finite number of sites exist on a substrate to which the first precursor may form chemical bonds. The second precursor might only bond to the first precursor and thus may also be self-limiting. Once all of the finite number of sites on a substrate is bonded with a first precursor, the first precursor will often not bond to other of the first precursor already bonded with the substrate. This self-limiting property may enable precursors to bond to a nanotube defect without bonding to other portions of a nanotube. A few examples of materials that may be deposited by ALD include metals, metal oxides, metal nitrides, and others.

The general technology of chemical vapor deposition (CVD) includes a variety of specific processes, including, but not limited to, plasma enhanced CVD and others. CVD is often used to form non-selectively a complete, deposited material on a substrate. One characteristic of CVD is the simultaneous presence of multiple precursors in the deposition chamber that react to form the deposited material. Such condition is contrasted with the purging criteria for traditional ALD wherein a substrate is contacted with a single deposition precursor that chemisorbs to a substrate or reacts with a previously deposited precursor.

An ALD process regime may provide a simultaneously contacted plurality of precursors of a type or under conditions such that ALD chemisorption, rather than CVD reaction occurs. Instead of reacting together, the plurality of precursors may chemisorb to a substrate or previously deposited precursor, providing a surface onto which subsequent precursors may next chemisorb or react to form a complete layer of desired material. For example, the plurality of precursors may chemisorb to the defect of a nanotube without the precursors reacting with one another. In this manner, multiple, different tags may be deposited at a nanotube defect.

Under most CVD conditions, deposition occurs largely independent of the composition or surface properties of an underlying substrate. By contrast, chemisorption rate in ALD might be influenced by the composition, crystalline structure, and other properties of a substrate or chemisorbed precursor. Other process conditions, for example, pressure and temperature may also influence chemisorption rate. In comparison to the predominantly thermally driven CVD, ALD is predominantly chemically driven. Accordingly, ALD is often conducted at much lower temperatures than CVD.

Known process conditions for ALD may yield the desired results described herein. Further, it is conceivable that CVD conditions might be identified which result in selective deposition at a nanotube defect. Such a deposition, or other selective deposition techniques, may be used in the embodiments of the invention.

Chemical and/or physical properties of a tag may be selected that correspond with a certain removal technique. As one option, the tag may contain a ferromagnetic material and the removing may include applying a magnetic field. As another option, the tag may contain an ionic material and the removing may include applying an electric field. As a further option, the tag may contain an atom having an atomic mass greater than the atomic mass of carbon and the removing may include applying a centrifugal force to the nanotube mixture. Any two or more of the indicated removal techniques may be combined.

Understandably, removal efficiency may vary amongst removal techniques, tags, properties of the nanotubes, and other factors. Consequently, repeating a removal technique and/or using different removal techniques may be useful to enhance removal efficiency. It is conceivable that a technique may remove all of the tagged nanotubes such that the mixture consists of untagged nanotubes, but in doing so removes an excessive amount of untagged nanotubes as well. In such case, the repeated or different removal technique may be applied to the removed mixture of tagged and untagged nanotubes.

In the event that multiple, different removal techniques are used, some consideration may be given to properties of the tag. A single tag may exhibit properties that correspond to multiple removal techniques. In one example, if a tag is selected containing an atom having an atomic mass greater than the atomic mass of carbon and the tag is also ionic and ferromagnetic, then the tag is capable of use in a method that applies one or more of a centrifugal force, an electric field, or a magnetic field. In another example, a nanotube may be initially tagged to correspond only to one removal technique and some nanotubes removed. Initial removal may be followed by removal and replacement or modification of the initial tag to provide another tag or a modified tag with different properties that correspond to another removal technique. In a further example, multiple, different tags may be deposited at the nanotube defect, the different tags corresponding to different removal techniques.

Potential ferromagnetic materials that may be provided in a tag include iron, cobalt, nickel, gadolinium, and dysprosium. Precursors that may be used to deposit ferromagnetic materials include volatile metal acetamidinates, which may be used with $H_2$ to deposit pure metal. For example, [M(RNC$(CH_3)NR)_2$], where M is Fe, Co, or Ni and R is t-butyl for Fe and isopropyl for Co and Ni. Potential materials heavier than carbon that may be provided in a tag include iron, cobalt, strontium oxide, and strontium titanate oxide (STO). Notably, the ferromagnetic materials listed above all have an atomic mass greater than carbon. Precursors, in addition to the ferromagnetic precursors, that may be used to deposit materials heavier than carbon include $Sr(THD)_2$, $Sr(DPM)_2$, and $Ti(THD)_2(MPD)$, where THD is tetramethylheptanedionate, DPM is dipyvaloylmethane, and MPD is methylpentanediolate, with may be used with oxidizers such as $O_3$, $H_2O$, and/or $O_2$ to deposit oxides.

Techniques for orienting nanotubes in an electric or magnetic field are described in U.S. patent application Ser. No. 11/107,125 filed Apr. 15, 2005 by Sandhu et al. and published Oct. 19, 2006 under Publication No. US 2006/0233694, which functionalizes nanotubes with magnetic or electrically responsive material. Such functionalizing allows organization of nanotubes in response to the electric or magnetic field to orient them within a recess prior to shortening the nanotubes. Using the electric field essentially amounts to electrophoresis. Sandhu does not describe functionalizing nanotubes selectively on the basis of the presence of a defect. However, utilizing the teachings herein, the application Ser. No. 11/107,125 nanotube organization techniques might be reconfigured and adapted to instead remove tagged nanotubes as in the embodiments of the present specification.

Figure 2:
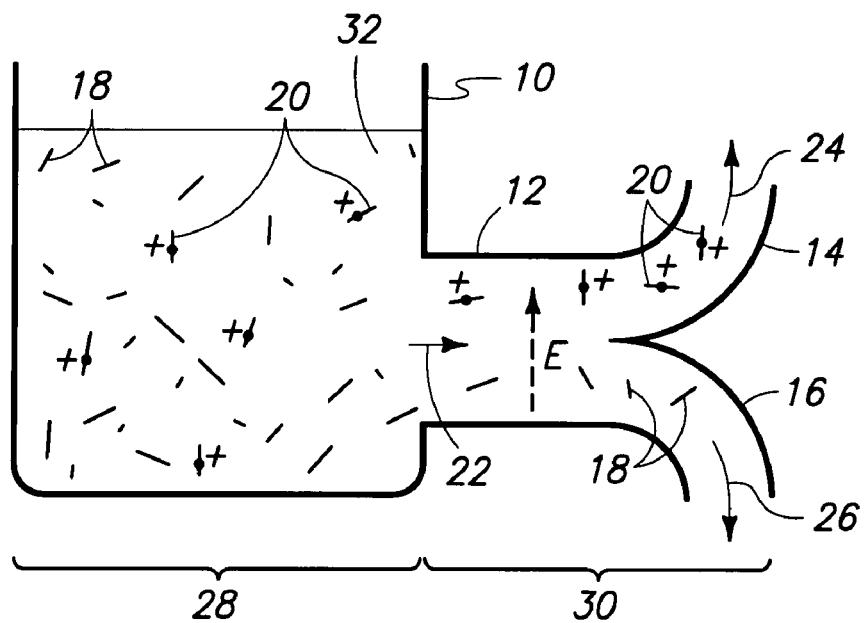
Figure 3:
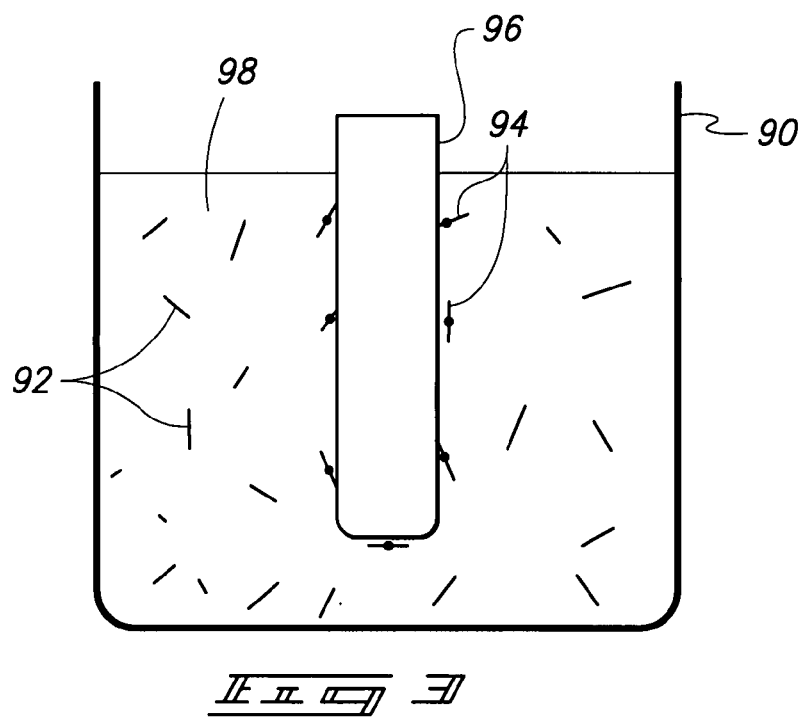

FIGS. 1-4 illustrate other techniques for removing tagged nanotubes. More specifically, FIGS. 1 and 3 illustrate possible embodiments including applying a magnetic field. In FIG. 1, a fluid 62 within a reservoir 40 contains a mixture of nanotubes 48 and ferromagnetically tagged nanotubes 50. Such components represent a suspension device 58, which maintains nanotubes 48 and tagged nanotubes 50 in a state suitable for use in a separation device 60, also shown in FIG. 1. In the case where fluid 62 is a liquid, suspension device 58 may include a stirring mechanism. Also, the nanotubes may be miscible in the liquid to provide a uniform distribution. In the case where fluid 62 is a gas, such as air, suspension device 58 may include an air injection apparatus, such as a fluidized bed, achieving a similar effect. Even though reservoir 40 is shown as an open, a closed reservoir may be used, depending on the type of suspension process, to contain fluid 62 and the nanotubes. Other known apparatuses for achieving the purposes of suspension device 58 may be included.

A flow 52 of fluid 62 containing nanotubes 48 and tagged nanotubes 50 enters separation device 60 through a duct 42. Due to the ferromagnetic tag, a magnetic field B applied to flow 52 moves tagged nanotubes 50 away from some of nanotubes 48 lacking tags. The strength of magnetic field B and the responsiveness of ferromagnetic material in the tag may be sufficient to move tagged nanotubes 50 away from nanotubes 48 such that a flow 54 containing tagged nanotubes 50 enters a duct 44 while a flow 56 of nanotubes 48 enters a duct 46. Understandably, flow 54 may potentially contain some of nanotubes 48 when they are in alignment with duct 44 upon entering duct 42, since magnetic field B does not change such alignment. In contrast, flow 54 may contain primarily, and possibly entirely, nanotubes 48 given an adequate magnetic response.

Thus, even though flow 54 may contain some of nanotubes 48, tagged nanotubes 50 may be removed sufficiently to produce flow 56. As described, a nanotube separation method may essentially include placing the nanotube mixture in a fluid, wherein removing the tagged nanotube from the mixture occurs while the fluid containing the mixture is flowing through a duct. Those of ordinary skill will appreciate that a variety of alternative configurations and modifications for separation device 60 are possible that still rely upon the fundamental principles demonstrated in FIG. 1

Instead of a fluid containing the nanotube mixture flowing through a duct, FIG. 3 illustrates another method wherein a fluid 98 in a reservoir 90 contains nanotubes 92 and ferromagnetically tagged nanotubes 94. A magnet 96 in fluid 98 applies a magnetic field and attracts ferromagnetically tagged nanotubes 94. Removing magnet 96 from fluid 98 may thus remove tagged nanotubes 94 from fluid 98 by virtue of their attraction to magnet 96. Nanotubes 92 and tagged nanotubes 94 may be suspended in fluid 98 using mechanisms such as those described above for suspension device 58 in FIG. 1. Also, fluid 98 may be a gas or a liquid.

FIG. 3 illustrates a method referred to herein as magnetic plating. In the same sense that electroplating allows metal ions to plate onto an electrode, forming a metal layer, a magnetic plating method allows ferromagnetic material to plate onto a magnetized surface, forming a layer of such material. The magnetized surface may be that of a permanent magnet, electromagnet, etc. The magnet may be constructed with a shape that increases its surface area and/or may comprise a porous material, which increases surface area.

In either FIG. 1 or FIG. 3, the mixture of nanotubes in flow 56 or the mixture that remains in fluid 98 after removal of magnet 96 contains untagged nanotubes which lack the defect associated with the tags on tagged nanotubes 50 or 94. Therefore, a nanotube separation method according to an embodiment of the present specification includes chemisorbing a ferromagnetic tag on a nanotube in a nanotube mixture. The nanotube has a defect, the tag chemisorbs at the defect where a chemisorption rate is greater than on another nanotube in the mixture lacking the defect, and the tag does not chemisorb on the other nanotube. The method involves placing the mixture in a liquid and removing the tagged nanotube from the mixture, including applying a magnetic field which uses the tag to move the tagged nanotube away from the untagged nanotube. After the removing, the mixture contains the untagged nanotube.

It is possible that better response of the tagged nanotube to the magnetic field might be obtained by increasing the extent or volume of chemisorbed material beyond a single monolayer. Consequently, chemisorbing the tag may include atomic layer depositing the tag. The tag may include a plurality of monolayers.

FIG. 2 illustrates a nanotube separation method analogous to that shown in FIG. 1 except that tagged nanotubes 20 include an ionic material. In FIG. 2, the tags are cationic as indicated by the "+" sign associated with tagged nanotubes 20. As may be appreciated, a fluid 32 in a reservoir 10 contains nanotubes 18 and tagged nanotubes 20. The nanotube mixture may be suspended with a suspension device 28. A flow 22 of nanotubes 18 and tagged nanotubes 20 in fluid 32 enters a duct 12. An electric field E is applied to flow 22, moving tagged nanotubes 20 away from nanotubes 18 such that a flow 24 enters a duct 14 and contains tagged nanotubes 20, potentially along with some of nanotubes 18. Also, a flow 26 containing primarily, and perhaps entirely, nanotubes 18 enters a duct 16. Thus, separation occurs within a separation device 30.

Other considerations discussed above with regard to FIG. 1 may also apply to FIG. 2. For example, fluid 32 may be a gas or liquid. In the event that fluid 32 is a gas, the concepts associated with FIG. 2 may relate to conventional ion implantation techniques. The primary difference being that the ions in FIG. 2 are deposited on nanotubes. Techniques in ion implantation for directing a flow of specific ions toward an implant substrate using an electromagnetic and electrostatic field might be adapted to direct a flow of ionically tagged nanotubes away from untagged nanotubes.

Figure 4:
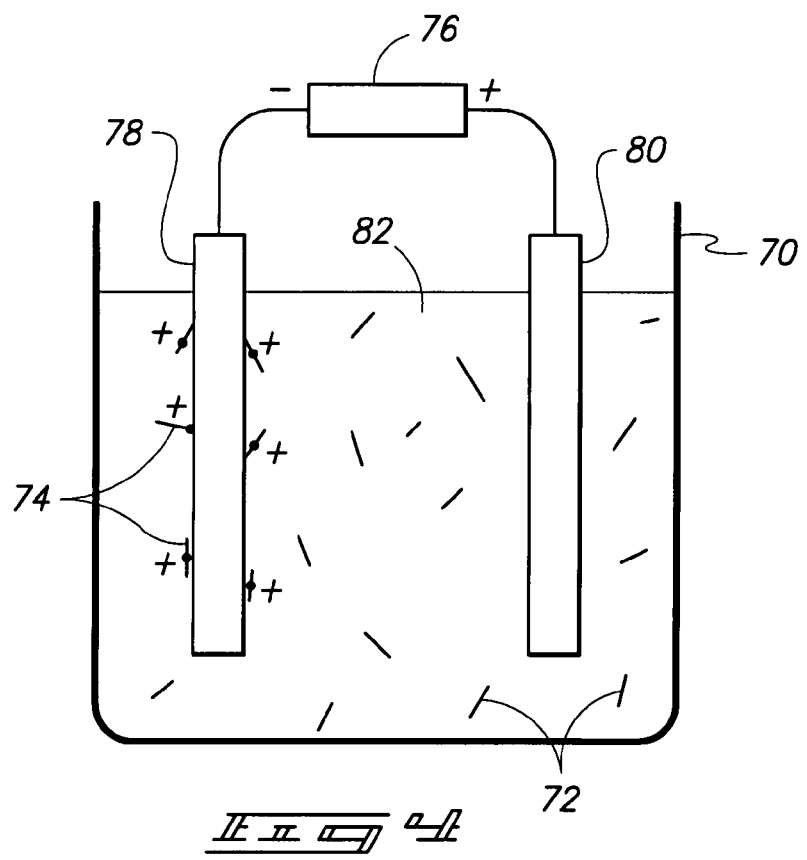

FIG. 4 illustrates a nanotube separation method analogous to that shown in FIG. 3. A fluid 82 in a reservoir 70 contains nanotubes 72 and ionically tagged nanotubes 74. An anode 78 and a cathode 80 in fluid 82 are connected to a voltage source 76. Given the presence of ionic tags on tagged nanotubes 74, tagged nanotubes 74 may be attracted to and "plate" onto anode 78. The technique involves principles related to conventional electroplating, except that tagged nanotubes comprise the material plated. Understandably, fluid 82 may be an electrolyte enabling the described electroplating.

Accordingly, a nanotube separation method in an embodiment of the present specification includes chemisorbing an ionic material tag on a nanotube in a nanotube mixture, the nanotube having a defect, the tag chemisorbing at the defect where a chemisorption rate is greater than on another nanotube in the mixture lacking the defect, and the tag not chemisorbing on the other nanotube. The method involves placing the mixture in a liquid and removing the tagged nanotube from the mixture, including applying an electric field which uses the tag to move the tagged nanotube away from the untagged nanotube. After the removing, the mixture contains the untagged nanotube.

In the described methods that involve applying an electric field, depositing a tag may involve depositing a charge neutral tag, wherein the tag subsequently becomes ionic, instead of depositing an ionic tag. For example, the methods may further include severing a portion of the tag, leaving an ionic material on the tagged nanotube. The severing may be initiated by a variety of chemical mechanisms known to those of ordinary skill, including application of optical energy. Alternatively, a portion of the tag as deposited may merely dissociate into a solvent, such as the electrolyte or $H_2O$, leaving an ionic material on the tagged nanotube.

One of the removal techniques mentioned above includes applying a centrifugal force to the nanotube mixture. As one example, centrifuges operate on well known principles and apply a centrifugal force in order to separate substances of different specific gravities. A variety of centrifuges are known, from familiar laboratory centrifuges to ultra-high efficiency centrifuges, which are used to separate elemental isotopes merely by the specific gravity difference arising from the mass of a few neutrons. Tagging a nanotube using atoms having an atomic mass greater than the atomic mass of carbon may change the nanotube's specific gravity compared to untagged nanotubes, allowing separation by applying a centrifugal force, such as in a centrifuge. If the tag has a sufficiently greater mass, then untagged nanotubes of various lengths may still be lighter in comparison and can be separated.

In the case of nanotubes formed from carbon, a nanotube may be tagged with a tag that contains an atom having an atomic mass greater than the atomic mass of carbon. Thus, the tagged nanotube may exhibit a specific gravity different from that of the other nanotubes in a nanotube mixture. Applying a centrifugal force may consequently move the tagged nanotube away from the untagged nanotube.

In a centrifuge, either of the separated fractions of tagged or untagged nanotubes may be removed from the centrifuge, leaving behind the other fraction. In either manner, the tagged nanotube may be removed from the nanotube mixture. Conventional centrifuges represent suitable devices for applying a centrifugal force. However, it is conceivable that other devices may be suitable. Selection of a device may depend primarily on operational efficiency of the centrifuge resulting from specific gravity differences determined by the atomic mass of an atom in a nanotube tag. Accordingly, increased separation efficiency may result from an increased difference in specific gravity. The difference in specific gravity may be increased by utilizing a plurality of the atoms heavier than carbon and/or atoms that are much heavier. A tag that contains a plurality of atoms having atomic masses that are at least ten times the atomic mass of carbon is expected to allow use of familiar laboratory centrifuges to separate defective carbon nanotubes.

It will be appreciated that a nanotube separation method according to an embodiment of the present specification includes chemisorbing a tag on a carbon nanotube in a nanotube mixture, the tag containing an atom having an atomic mass greater than the atomic mass of carbon, the nanotube having a defect, the tag chemisorbing at the defect where a chemisorption rate is greater than on another carbon nanotube in the mixture lacking the defect, and the tag not chemisorbing on the other nanotube. The method involves placing the mixture in a liquid and removing the tagged nanotube from the mixture, including applying a centrifugal force to the nanotube mixture and using the tag to move the tagged nanotube away from the untagged nanotube. After the removing, the mixture contains the untagged nanotube.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

I claim:

1. A defective nanotube separation method comprising: depositing by atomic layer deposition a tag on a nanotube having a conductive, semiconductive, or insulative type of intrinsic conductivity in a nanotube mixture, the nanotube having a defect, the tag depositing at the defect where a deposition rate is greater than on another nanotube in the mixture lacking the defect, the other nanotube having the same type of intrinsic conductivity as the tagged nanotube, and the tag not depositing on the other nanotube;

removing the tagged nanotube from the mixture by using the tag; and after the removing, the mixture containing the untagged other nanotube having the same type of intrinsic conductivity as the tagged nanotube.

2. The method of claim 1 wherein the depositing the tag comprises chemisorbing the tag at the defect where a chemisorption rate is greater than on the other nanotube in the mixture lacking the defect.

3. The method of claim 2 wherein the tag does not chemisorb on the other nanotube lacking the defect.

4. The method of claim 2 wherein the tag consists of a single monolayer of molecules chemisorbed at the defect.

5. The method of claim 1 wherein the tag comprises a plurality of monolayers.

6. The method of claim 1 wherein the tagged nanotube and the untagged nanotube are conductive.

7. The method of claim 1 wherein the tag comprises an ionic material and the removing comprises applying an electric field.

8. The method of claim 1 further comprising severing a portion of the tag, leaving an ionic material on the tagged nanotube, wherein the removing comprises applying an electric field.

9. The method of claim 1 wherein a portion of the tag dissociates into a solvent, leaving an ionic material on the tagged nanotube, and the removing comprises applying an electric field.

10. The method of claim 1 wherein depositing the tag comprises tagging a conductive nanotube and a semiconductive nanotube during the same tagging process, removing the tagged nanotube comprises removing the conductive and semiconductive tagged nanotubes during the same removal process and, after the removing, the same mixture contains conductive and semiconductive untagged other nanotubes.

11. The method of claim 1 further comprising placing the mixture in a fluid comprising a gas.

12. The method of claim 1 further comprising placing the mixture in a fluid comprising a liquid.

13. The method of claim 1 further comprising placing the mixture in a fluid, wherein the removing occurs while the fluid containing the mixture is flowing through a duct.

14. The method of claim 1 wherein, when depositing the tag, the mixture consists of nanotubes having the same type of intrinsic conductivity.

15. The method of claim 1 wherein the tagged nanotube and the untagged nanotube are metallic.

16. A defective nanotube separation method comprising: chemisorbing by atomic layer deposition an ionic material tag on a nanotube having a type of intrinsic conductivity in a nanotube mixture, the nanotube having a defect, the tag chemisorbing at the defect where a chemisorption rate is greater than on another nanotube in the mixture lacking the defect, the other nanotube having the same type of intrinsic conductivity as the tagged nanotube, and the tag not chemisorbing on the other nanotube;

placing the mixture in a liquid;

removing the tagged nanotube from the mixture, including applying an electric field which uses the tag to move the tagged nanotube away from the untagged nanotube; and after the removing, the mixture containing the untagged other nanotube having the same type of intrinsic conductivity as the tagged nanotube.

17. The method of claim 16 wherein the tag consists of a single monolayer of molecules chemisorbed at the defect.

18. The method of claim 16 further comprising severing a portion of an initially chemisorbed tag, leaving the ionic material chemisorbed to the tagged nanotube.

19. The method of claim 16 wherein a portion of an initially chemisorbed tag dissociates into a solvent, leaving the ionic material chemisorbed to the tagged nanotube.

20. The method of claim 16 wherein the removing comprises electroplating.

21. The method of claim 16 wherein the removing occurs while the liquid containing the mixture is flowing through a duct.

22. A defective nanotube separation method comprising:

tagging a plurality of conductive nanotubes and a plurality of semiconductive nanotubes in a nanotube mixture during the same tagging process, the tagging process comprising atomic layer deposition, the tags containing one or more materials responsive to one or more of a magnetic field, an electric field, or a centrifugal force, the tagged nanotubes each having a defect, a plurality of other conductive nanotubes and a plurality of other semiconductive nanotubes in the mixture not containing a defect, and the other nanotubes not becoming tagged;

applying one or more of the magnetic field, the electric field, or the centrifugal force to the nanotube mixture;

moving the conductive and semiconductive tagged nanotubes away from at least some of the conductive and semiconductive untagged other nanotubes during the same moving process by using the tags and one or more of the magnetic field, the electric field, or the centrifugal force;

removing at least some of the moved, conductive and semiconductive tagged nanotubes from the nanotube mixture during the same removal process; and after the removing, the same mixture containing the conductive and semiconductive untagged other nanotubes.

23. The method of claim 22 wherein the removing comprises electroplating.

24. The method of claim 22 further comprising placing the mixture in a fluid, wherein the removing occurs while the fluid containing the mixture is flowing through a duct.

* * * * *